(12) United States Patent
Egbert et al.

(10) Patent No.: US 6,807,176 B1
(45) Date of Patent: Oct. 19, 2004

(54) ARRANGEMENT FOR SWITCHING DATA PACKETS IN A NETWORK SWITCH BASED ON SUBNET IDENTIFIER

(75) Inventors: Chandan Egbert, San Jose, CA (US); Mrudula Kanuri, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 785 days.

(21) Appl. No.: 09/650,648

(22) Filed: Aug. 30, 2000

Related U.S. Application Data

(60) Provisional application No. 60/218,570, filed on Jul. 13, 2000.

(51) Int. Cl.$^7$ .............................................. H04L 12/28
(52) U.S. Cl. ................. 370/392; 370/395.31; 370/395.5
(58) Field of Search ............................ 370/395.1, 392, 370/389, 401, 395.5, 395.51, 395.52, 395.53, 395.54, 395.31, 395.32

(56) References Cited

U.S. PATENT DOCUMENTS

| | | | | |
|---|---|---|---|---|
| 5,251,205 A | * | 10/1993 | Callon et al. ................ | 370/392 |
| 5,309,437 A | * | 5/1994 | Perlman et al. ............. | 370/401 |
| 5,742,604 A | * | 4/1998 | Edsall et al. ................ | 370/401 |
| 5,914,938 A | * | 6/1999 | Brady et al. ................ | 370/254 |
| 5,953,335 A | * | 9/1999 | Erimli et al. ............... | 370/390 |
| 6,023,563 A | * | 2/2000 | Shani ......................... | 703/249 |
| 6,088,356 A | * | 7/2000 | Hendel et al. .............. | 370/392 |
| 6,104,696 A | * | 8/2000 | Kadambi et al. ........... | 370/218 |
| 6,115,385 A | * | 9/2000 | Vig ............................. | 370/401 |
| 6,157,644 A | * | 12/2000 | Bernstein et al. ........... | 370/392 |
| 6,195,356 B1 | * | 2/2001 | Anello et al. ............... | 370/398 |
| 6,256,314 B1 | * | 7/2001 | Rodrig et al. ............... | 370/401 |
| 6,430,188 B1 | * | 8/2002 | Kadambi et al. ........... | 370/398 |
| 6,490,276 B1 | * | 12/2002 | Salett et al. ................ | 370/360 |
| 6,560,236 B1 | * | 5/2003 | Varghese et al. ............ | 370/401 |

OTHER PUBLICATIONS

Bridges, Routers, and Gateways Technology Overview by Black Box issue 12/27/99.*

Subnet addressing, Chapter 3, pp.: 42–44, TCP/IP Illustrated vol. 1, The Protocols by W. Richard Stevens, 1994.*

* cited by examiner

*Primary Examiner*—Frank Duong
(74) *Attorney, Agent, or Firm*—Manelli Denison & Selter PLLC; Leon R. Turkevich

(57) ABSTRACT

A network switch includes a switching module and network switch ports connecting respective subnetworks. The switching module includes a plurality of address tables for storing address information (e.g., layer 2 and layer 3 address and switching information), where at least one table is configured for storing subnetwork identifiers of subnetworks that are reachable by the network switch.

5 Claims, 3 Drawing Sheets

ARRANGEMENT FOR SWITCHING DATA PACKETS IN A NETWORK SWITCH BASED ON SUBNET IDENTIFIER This application claims the benefit of Provisional Application Ser. No. 60/218570 filed Jul. 13, 2000.

BACKGROUND OF THE INVENTION

1. Field of the Invention

The present invention relates to layer 2 and layer 3 switching of data packets in cascaded non-blocking network switches configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). In addition, efforts to add layer 3 processing to a network switch may result in additional problems, especially if multiple switches are cascaded in an attempt to increase switching capacity.

One such problem involves the looping of a data packet addressed to a different subnetwork. In particular, FIG. 1 illustrates one possible network arrangement, where network switches 2a and 2b are interconnected by an expansion bus 4. The network switch 2a has network switch ports coupled to respective subnetworks 6a and 6b, and a router 8. The network switch 2b has network switch ports coupled to the respective subnetworks 6c and 6d.

Each network switch 2 typically is configured to include layer 3 (e.g., IP) addresses only for host stations that are directly connected to the corresponding switch, such that the switch 2a would store the layer 3 addresses for only the host stations in the subnetwork 6a or 6b, and the switch 2b would store the layer 3 addresses for only the host stations in the subnetwork 6c or 6d. Consequently, if a host station in subnetwork 6a output a data packet that specifies a destination IP address of a host station in the subnetwork 6d, the switch 2a would forward the data packet having the unknown destination IP addresses to the router 8. However the router 8, upon determining that the destination station is reachable via the switch 2a, would forward the data packet back to the switch 2a, creating a loop between the router 8 and the switch 2a.

Although the above-described looping problem can be eliminated by adding within each network switch 2 the layer 3 addresses of all host stations that are reachable by that network switch 12 (e.g., adding layer 3 addresses for host stations in subnetworks 6c or 6d into the address table of the network switch 2a), the substantially large number of network stations would quickly overwhelm the memory capacity of the address tables within each switch, requiring a substantially large memory.

SUMMARY OF THE INVENTION

There is a need for an arrangement that enables a network switch to provide layer 2 switching and layer 3 switching capabilities between cascaded network switches serving different subnetworks, without looping of data packets between the network switch and a router.

There is also a need for an arrangement that enables cascaded network switches to provide layer 2 switching and layer 3 switching with minimal transfer of data packets to a router.

These and other needs are attained by the present invention, where a network switch includes a switching module and network switch ports connecting respective subnetworks. The switching module includes a plurality of address tables for storing address information (e.g., layer 2 and layer 3 address and switching information), where at least one table is configured for storing subnetwork identifiers of subnetworks that are reachable by the network switch.

One aspect of the present invention provides a method in a network switch coupled to a first group of subnetworks and a second network switch, where the second network switch is coupled to a second group of subnetworks. The method includes receiving from a host station in the first group of subnetworks a layer 2 packet having layer 3 destination information having a destination network identifier, a destination subnetwork identifier, and a destination host identifier, the destination subnetwork identifier identifying a destination subnetwork for the layer 2 packet. The method also includes searching for the destination subnetwork identifier in a table, having stored subnetwork identifiers specifying subnetworks reachable by the network switch via respective specified output ports, and forwarding the layer 2 packet to an identified one of the specified output ports based on locating the destination subnetwork identifier within the table. Searching for the destination subnetwork identifier in a table and forwarding the layer 2 packet based on locating the destination subnetwork identifier within the table enables the network switch to locate subnetworks that are remotely reachable, for example via other network switches via an expansion port, without unnnecessarily populating the address tables with individual IP addresses of host stations. Hence, layer 3 switching can be implemented in a network switch, without concern of looping between the network switch and a router.

Another aspect of the present invention provides a network switch. The network switch includes a plurality of network switch ports, each configured for receiving data packets from a corresponding connected subnetwork having a corresponding subnetwork identifier. The network switch also includes an expansion port configured for transferring data packets between the network switch and a second network switch serving another group of subnetworks, and switching logic. The switching logic includes a subnetwork table having table entries, each table entry having a stored subnetwork identifier specifying a subnetwork reachable by the network switch and a corresponding port identifier that specifies one of the network switch ports and the expansion port for reaching the corresponding subnetwork, the switching logic selecting a destination port for one of a destination subnetwork and a router based on a locating a layer 3 destination subnetwork identifier of a received data packet in the subnetwork table.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
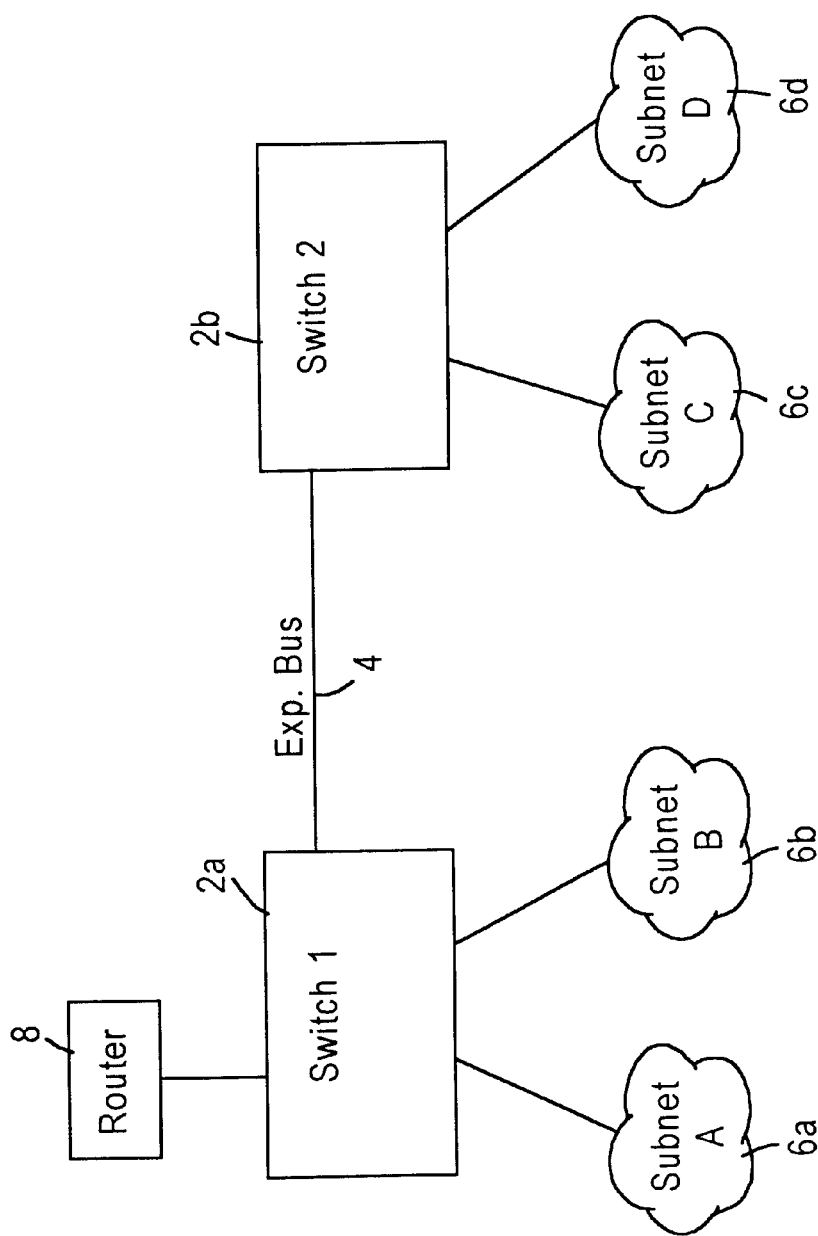
FIG. 1 is a block diagram of a (prior art) packet switched network having a conventional network switch for switching data packets between subnetworks.
Figure 2:
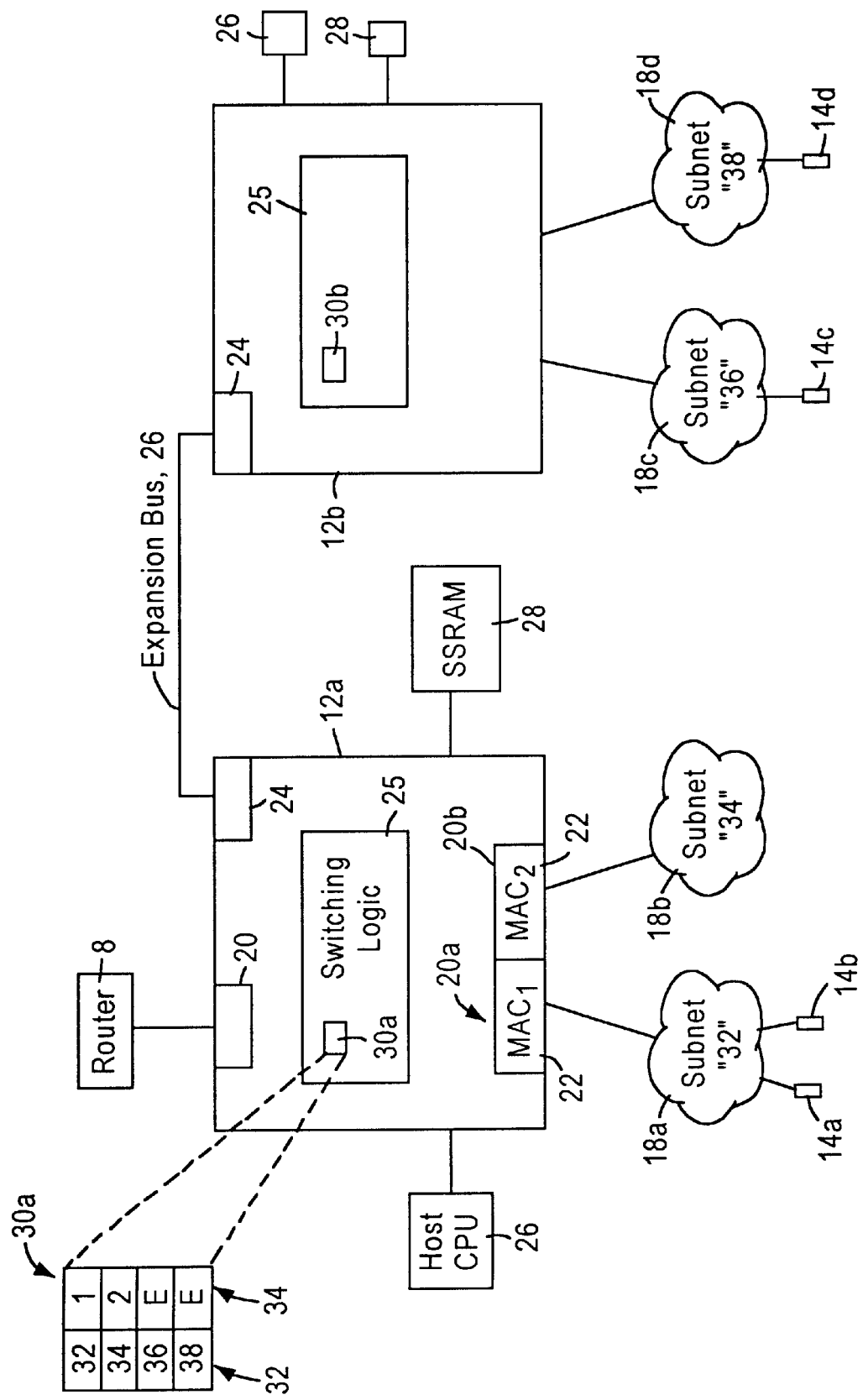
FIG. 2 is a diagram illustrating a packet switched network having a network switch configured for switching data packets between subnetworks according to an embodiment of the present invention.

FIG. 2 is a block diagram illustrating a packet switched network 10, such as an Ethernet (IEEE 802.3) network. The packet switched network includes integrated (i.e., single chip) multiport switches 12a and 12b that enable communication of data packets between network stations 14. Each network station 14, for example a client workstation, is typically configured for sending and receiving data packets at 10 Mbps or 100 Mbps according to IEEE 802.3 protocol.

As shown in FIG. 2, the network 10 includes a plurality of subnetworks 18a, 18b, 18c, and 18d, each having a corresponding group of network stations 14 and a unique subnetwork identifier (e.g., "32", "34", "36", and "38", respectively). Each network station 14 within a given subnetwork 18 has a host identifier that enables the transmitting network station 14 to be uniquely identified within the corresponding subnetwork 18. Hence, each switch 12 can uniquely identify any transmitting node and its associated subnetwork based on the host identifier and the subnetwork identifier, described in further detail below.

The switch 12 includes switch ports 20, each including a media access control (MAC) module 22 that transmits and receives data packets to the associated network stations 14 across 10/100 Mbps physical layer (PHY) transceivers (not shown) according to IEEE 802.3u protocol. The switch 12 also includes an expansion port 24 configured for transferring data packets between the network switches 12a and 12b via an expansion bus 26. The switch 12 also includes a switching logic 25 configured for making frame forwarding decisions for received data packets. In particular, the switching logic 25 is configured for layer 2 switching decisions based on source address, destination address, and VLAN information within the Ethernet (IEEE 802.3) header, the switching logic 25 is also configured for selective layer 3 switching decisions based on evaluation of IP address information within the Ethernet packet.

As shown in FIG. 2, the switch 12 has an associated host CPU 26 and a buffer memory 28, for example an SSRAM. The host CPU 26 controls the overall operations of the corresponding switch 12, including programming of the switching logic 25. The buffer memory 28 is used by the corresponding switch 12 to store data frames while the switching logic 25 is processing forwarding decisions for the received data packets.

Each switch port 20 of FIG. 2 is configured for performing layer 3 processing that enables the switching fabric 25 to identify a selected layer 3 switching entry to execute the appropriate layer 3 switching decision corresponding to the identified layer 3 switching entry.

Moreover, the switching logic 25 is configured to include at least one subnetwork address table 30 configured for storing the layer 3 switching information for the corresponding subnetwork 18, namely the subnetwork ID 32 and the corresponding output switch port identifier 34. As shown in FIG. 2, the subnetworks 18a and 18b are locally reachable (i.e., is served by one or more connected switch ports 20) by the switch 12a, and the subnetworks 18c and 18d are locally reachable by the switch 12b. In contrast, the subnetworks 18a and 18b are remotely reachable (i.e., via transfer through the expansion bus 26 to another switch 12) by the switch 12b, and the subnetworks 18c and 18d are remotely reachable by the switch 12a. If a subnetwork 18 is locally reachable (i.e., is served by one or more connected switch ports 20) by the corresponding switch 12, then multiple subnetwork-specific address tables may be used to provide more precise layer 3 switching information once the switching logic 25 determines that the identified subnetwork is locally reachable.

Figures 3, 4:
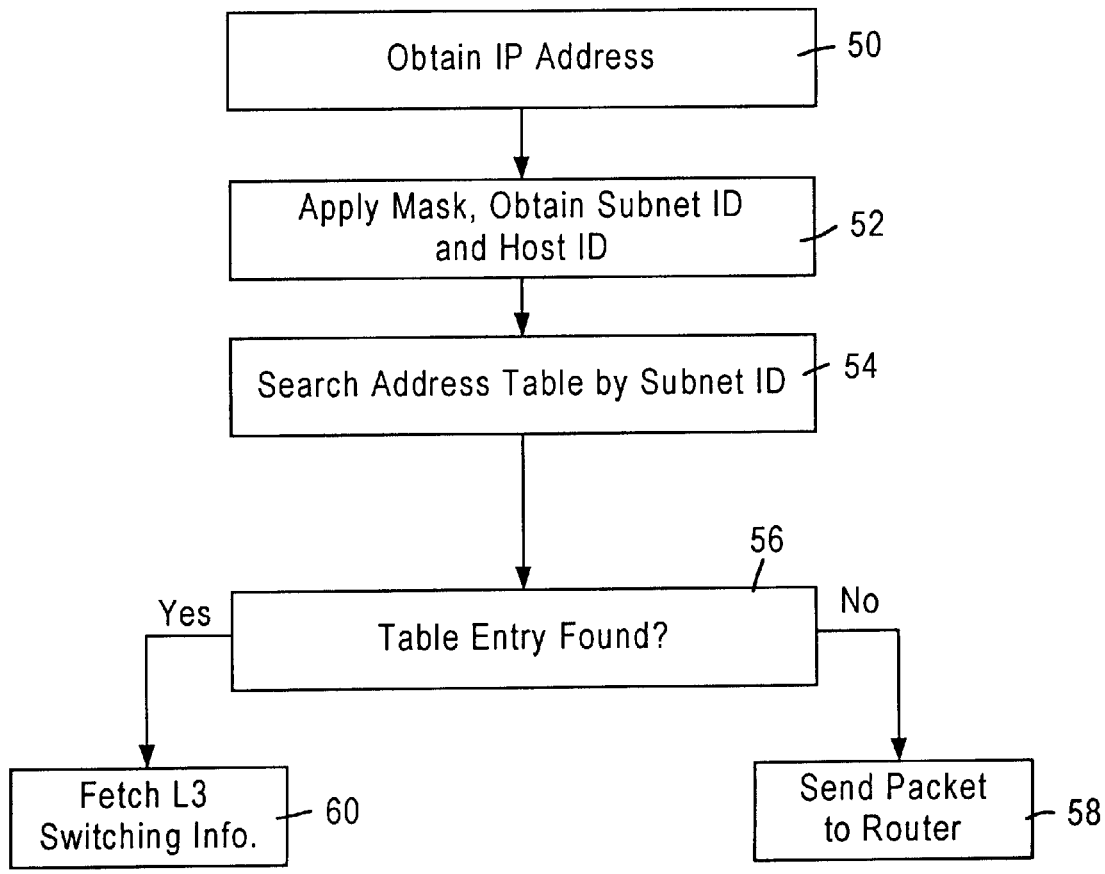
FIG. 3 is a diagram illustrating a layer 3 IP address field having a network identifier, a subnetwork identifier, and a host identifier.
FIG. 4 is a diagram illustrating the method of performing address searches using the subnetwork address table of FIG. 2 according to an embodiment of the present invention.

FIG. 3 is a block diagram illustrating an IP address field 40, for example an IP source address field, that includes a network identifier field 42, a subnetwork identifier field 44, and a host identifier field 46. The IP address field 40 is 32 bits (4 bytes) wide. Any IP address 40 can be typically classified into one of the following five classes: CLASS A, CLASS B, CLASS C, CLASS D, and CLASS E. The CLASS A packet includes one byte of network identifier field 42, and three bytes of subnetwork identifier field 44 and host identifier field 46; hence, the range of CLASS A network identifier fields is 0–127. The CLASS B packet includes two bytes of network identifier field 42, and two bytes of subnetwork identifier field 44 and host identifier field 46; hence, the range of CLASS B network identifier fields is 128–191. The CLASS C packet includes a three bytes of network identifier field 42, and one byte of subnet identifier field 44 and host identifier field 46; hence, the range of CLASS C network identifier fields is 192–223. The CLASS D packet is used for multicast purposes, and the CLASS E packet is for reserved addresses.

When a CLASS A address is assigned to a company or a firm, the company is given only the first byte of the address by the IANA. For example, assume a company is given the network identifier "122"; the company can then use all the addresses in the range 122.0.0.0 to 122.254.254.254. To simplify the task of routing, the remaining three bytes are divided into two fields, namely the subnet identifier field 44 and the host identifier field 46. The network administrator of the company can then divide the three bytes in any way desirable, for example one byte for the subnet identifier field 44 and two bytes for the host identifier field 46, or vice versa. Note that any other combination is also possible, and the subnet identifier field 44 and the host identifier field 46 do not necessarily need to be divided on byte boundaries.

Once the division within the IP address field 40 has been performed to establish the lengths of the network identifier field 42, the subnetwork identifier field 44, and the host identifier field 46, then the switching logic 25 is configured with a subnetwork mask that identifies how the fields are divided. For example, assume that the network administrator uses one byte for the subnetwork ID and two bytes for the host ID. Hence, the network "122" can have $2^8$ (256) subnetworks and $2^{16}$ host stations 14 in each subnetwork 18.

According to the disclosed embodiment, each switch 12 is configured for identifying the destination subnetwork of a received data packet merely by looking at the subnetwork identifier field 44 within the IP destination address field 40, and by using the appropriate mask. Once the destination subnetwork identifier has been determined, the switching logic 25 is able to search its subnetwork table 30 to determine whether the subnetwork is locally reachable or remotely reachable.

In particular, the subnetwork table 30 is configured for storing table entries, where each table entry specifies a stored subnetwork identifier 32 specifying a subnetwork 18 reachable by the network switch 12, and a port identifier (i.e., a port vector) that specifies at least one of the network switch ports 20 or 24 to be used as a destination port for reaching the corresponding identified subnetwork. For example, the subnetwork table 30a illustrates that the subnetworks 18a and 18b having subnetwork identifiers "32" and "34" are reachable by the switch 12a via the output switch ports 20a and 20b having port identifiers "1" and "2", respectively. In addition, the subnetwork table 30a illustrates that the subnetworks 18c and 18d having subnetwork identifiers "36" and "38" are reachable by the switch 12a via the expansion port 24 having the port identifier "E". Hence, the switching logic 25 can perform layer 3 processing on received data packets, even if the destination network node is in a subnetwork remotely reachable by the switch 12, without overwhelming the address tables of the switch 12.

FIG. 4 is a diagram illustrating the method of searching for address information within the switching module 25 according to an embodiment of the present invention. The method begins by a network switch port 20 receiving a layer 2 data packet and obtaining the IP address in step 50. In particular, each network switch port 20 is configured for obtaining the layer 3 address information, including IP source address, IP destination address, etc., and recovering the subnet identifier 44 and the host identifier 46 from the IP address field 40. The network switch port 20 applies a subnetwork mask in step 52, and obtains the subnet identifier field 44 and the host identifier field 46. For example, the switch port 20 performs a bitwise AND between the subnet mask "255.255.0.0" and the IP destination address "122.38.3.2" to obtain the value "122.38.0.0". Hence, the switch port 20 can determine that the network identifier field 42 has a value of "122", the subnetwork identifier field 44 has a value of "38", and the host identifier field 46 has a value of "3.2".

The network switch port 20 supplies the subnetwork identifier field 44 and the host identifier field 46 to the switching logic 25 for lookup processing. The switching logic 32, in response to receiving the subnetwork identifier field 44 having a value of "38", searches the subnetwork address table (e.g., table 30a) in step 54 for searching of address entries for the corresponding subnetwork 18d. Different search techniques may be used, for example a hash key may be generated to perform a bin-chain search, although preferably a simple linked list search is performed using the destination subnetwork identifier 44 as the search key.

If the switching logic 25 does not find the table entry in step 56, indicating that the destination subnetwork is not reachable, then the switching logic 25 forwards the layer 2 packet to the router 8 in step 58. However if the switching logic 25 does find the table entry in step 56, then the switching logic 25 fetches the layer 3 switching information (e.g., the port identifier 34) in step 60 and outputs the data packet on the specified output port to reach the destination subnetwork. In the above-described example, the switching logic 25 would identify the expansion port 24 from the destination port identifier "E" corresponding to the destination subnetwork identifier "38".

Although the disclosed arrangement is described with respect to CLASS A addresses, the disclosed techniques are equally applicable to CLASS B and CLASS C addresses.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switch coupled to a first group of subnetworks and a second network switch, the second network switch coupled to a second group of subnetworks, the method comprising:

receiving from a host station in the first group of subnetworks a layer 2 packet having layer 3 destination information having a destination network identifier, a destination subnetwork identifier, and a destination host identifier, the destination subnetwork identifier identifying a destination subnetwork for the layer 2 packet, each subnetwork of the first group of subnetworks connected to a corresponding switch port of the network switch, the network switch further including an expansion port for connecting the network switch and the second network switch;

searching for the destination subnetwork identifier in a table, having stored subnetwork identifiers specifying, subnetworks reachable by the network switch via respective specified output ports; and selectively forwarding the layer 2 packet to an identified one of the specified output ports based on locating the destination subnetwork identifier within the table, the selectively forwarding step including outputting by the identified one specified output port the layer 2 packet to the second network switch serving the destination subnetwork;

wherein the identified one specified output port is the expansion port, the outputting step including outputting the layer 2 packet onto the expansion bus interconnecting the network switch and the second network switch.

2. The method of claim 1, further comprising forwarding the layer 2 packet to a router based on a determined absence of the destination subnetwork identifier in the table.

3. The method of claim 2, wherein the layer 3 destination information is an Internet Protocol (IP) destination address.

4. A network switch comprising:

a plurality of network switch ports each configured for receiving data packets from a corresponding connected subnetwork having a corresponding subnetwork identifier;

an expansion port configured for transferring data packets between the network switch and a second network switch serving another group of subnetworks; and switching logic including a subnetwork table having table entries, each table entry having a stored subnetwork identifier specifying a subnetwork reachable by the network switch and a corresponding port identifier that specifies one of the network switch ports and the expansion port for reaching the corresponding subnetwork, the switching logic selecting a destination port for one of a destination subnetwork and a router based on a locating a layer 3 destination subnetwork identifier of a received data packet in the subnetwork table.

5. The method of claim 4, wherein the network switch obtains the layer 3 destination subnetwork identifier from a destination IP address field in the received data packet using a prescribed mask.

* * * * *